United States Patent Office 3,050,516
Patented Aug. 21, 1962

3,050,516
MONOAZO DYESTUFFS OF LOW SOLUBILITY IN WATER
Ernest Merian, Bottmingen, Otto Senn, Arlesheim, and Walter Wehrli, Riehen, Switzerland, assignors to Sandoz A.G., Basel, Switzerland
No Drawing. Filed Feb. 5, 1959, Ser. No. 791,277
Claims priority, application Switzerland Feb. 7, 1958
4 Claims. (Cl. 260—205)

This invention relates to new monoazo dyestuffs which have low solubility in water and are of the general formula

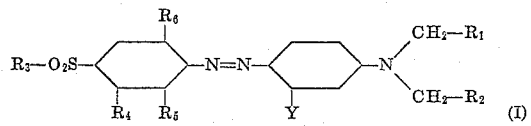

wherein $R_1$ stands for hydrogen, low molecular alkyl, low molecular hydroxyalkyl, low molecular alkoxy alkyl, low molecular acetoxyalkyl, low molecular propionyloxyalkyl, or a radical of a carbamic acid alkyl ester,
$R_2$ for low molecular acetoxyalkyl, low molecular propionyloxyalkyl, low molecular cyanoalkyl or a radical of a carbamic acid alkyl ester,
$R_3$ for an amino group which may be mono- or disubstituted,
$R_4$ for hydrogen, halogen, methyl, ethyl, trifluoromethyl, methoxy, ethoxy, or together with $R_5$ for a —CH=CH —CH=CH— chain,
$R_5$ for hydrogen, halogen, cyano, trifluoromethyl, low molecular alkylsulfonyl, a sulfonic acid amide group which may be mono- or disubstituted, or together with $R_4$ a —CH=CH—CH=CH— chain,
$R_6$ for hydrogen or halogen, and
Y for hydrogen, halogen, a low molecular alkyl or alkoxy radical, the trifluoromethyl or trifluoroacetylamino radical, or an alkanoylamino radical with not more than 18 carbon atoms.

The process for the production of the new monoazo dyestuffs of low water-solubility consists in combining 1 mol of the diazo compound of an amine of the general formula

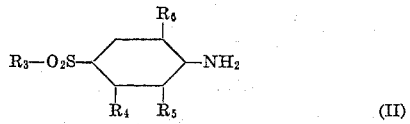

wherein $R_3$, $R_4$, $R_5$ and $R_6$ possess the aforecited meanings, with 1 mol of a compound of the formula

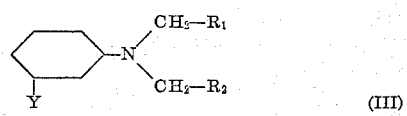

wherein $R_1$, $R_2$ and Y possess the aforecited meanings.

The diazo compounds are coupled with the coupling components in an acid medium, which may be buffered.

A number of the new monoazo dyestuffs dye from aqueous suspension polyamide fibers (e.g. nylon, "Perlon," registered trademark), cellulose ester fibers (e.g. secondary cellulose acetate, cellulose triacetate), polyvinyl fibers, polyacrylonitrile fibers and polyester fibers (e.g. "Dacron," "Terylene," registered trademarks) in brilliant yellow, orange and scarlet shades. The dyeings obtained with them possess very good fastness to light, gas fumes, washing, perspiration, water and sea water, and are white dischargeable. Viscose rayon, cotton and wool are comparatively well reserved by the dyestuffs, especially when the goods are aftertreated with hydrosulfites. With those dyestuffs of the present invention which possess sufficient affinity for cellulose triacetate and polyester fibers it is possible for the first time to produce on these fibers bright orange shades which are fast to light, pleating, sublimation, and heat setting. The solution of this technical problem was important above all in connection with brown mixtures. Certain of the new monoazo dyestuffs are also suitable for coloring oils, lacquers and synthetic resins, and for the dyeing of artificial fibers in the mass.

The spun-dyed shades given by these dyestuffs in secondary cellulose acetate and cellulose triacetate have high fastness to light, washing, perspiration, gas fumes, cross dyeing, alkaline bleaching, oxalic acid, dry cleaning, and peroxide bleaching. Also, they show excellent fastness to water, sea water, soap baths, crocking, decatizing, and pressing.

A great number of the amines which are employed here in the form of their diazo compounds are new. They are produced by the normal methods by the reaction of compounds of the formula

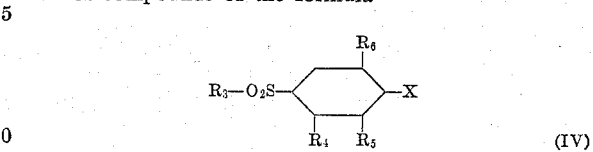

wherein $R_3$, $R_4$, $R_5$ and $R_6$ possess the aforesaid meanings, with ammonia at high temperatures when X stands for fluoro, chloro, bromo or alkoxy, and by treatment of the compounds of Formula IV with hydrolysing agents when X stands for an acylamino group.

A further process for the production of the primary amines, some of which are new, consists in reacting 1 mol of a compound of the formula

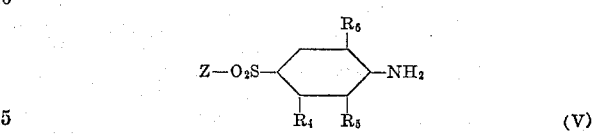

wherein $R_4$, and $R_5$, and $R_6$ possess the aforenamed meanings and Z represents halogen, with ammonia, or with a primary or secondary amine. This process of acid amide formation is carried out preferably in presence of an acid-binding agent or with the aid of an excess of the amine or ammonia which forms one of the reactants. $R_5$ and/or $R_6$=halogen may also be introduced by direct halogenative processes of 1-aminobenzene-4-sulfamides. The new products are isolated by one of the common basic operations, e.g. filtration, evaporation of the solvent, salting out, precipitation from the solvent with a suitable agent etc., where necessary after neutralization of the hydrolysing solution.

The new intermediate products are also intended for use in the production of pharmaceutical preparations.

In the following examples the parts and percentages are by weight and the temperatures in degrees centigrade. The melting points are uncorrected.

Example 1: 22.2 parts of 1-aminonaphthalene-4-sulfonic acid amide are dissolved in 200 parts of water and 32 parts of concentrated hydrochloric acid. After the addition of 200 parts of ice the amine is diazotized by dropwise addition of an aqueous solution of 7 parts of sodium nitrite. To the resultant diazo solution is added a solution of 20.4 parts of 1-(N-cyanoethyl-N-hydroxyethyl)-amino-3-methylbenzene in 50 parts of water, 50 parts of ice and 13 parts of concentrated hydrochloric acid. Coupling takes place instantaneously. The new dyestuff which has the formula

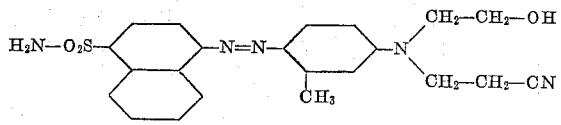

is subsequently filtered off, washed free of acid, and dried. It dissolves in organic solvents with an orange coloration and in concentrated sulfuric acid with a red-violet coloration. Applied from aqueous dispersion, it dyes cellulose acetate and nylon in bright, level orange shades. The dyeings have good fastness to light, gas fumes, perspiration, sea water, sublimation, and pleating, and are readily dischargeable.

The corresponding dyestuff (Example 2) obtained from N-cyanoethyl-N-hydroxyethylaminobenzene also dissolves in concentrated sulfuric acid to give red-violet solutions, and the dyeings produced with it on cellulose acetate and nylon possess similar fastness properties. On polyester fibers, however, it has a slightly more yellowish shade.

Example 3: 287 parts of 1-acetylaminonaphthalene-4-sulfonic acid are added to 833 parts of chlorosulfonic acid at 10–20°. The solution is stirred for 2 hours at 20° and then heated to 50°. After 16 hours at this temperature the reaction mass is run into a mixture of 8000 parts of ice and 1000 parts of water, upon which 1-acetylaminonaphthalene-4-sulfonic acid chloride precipitates. This is isolated by filtration and washed free of acid. The moist press cake obtained is mixed at room temperature with 500 parts of water, 500 parts of ice and 100 parts of methylamine. After 16 hours the temperature is gradually increased to 50°. Stirring is continued for 16 hours at the same temperature and after this time the precipitated 1-acetylaminonaphthalene-4-sulfonic acid methylamide, which melts at 221–225° in the crude state, is filtered off, washed free of alkali, and dried. 27.8 parts of the acetyl compound so formed are added to 200 parts of water and 32 parts of concentrated hydrochloric acid and saponified by boiling for 6 hours. The new intermediate product obtained in hydrochloric acid solution has the formula

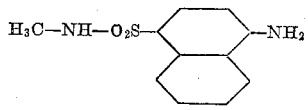

It is diazotized as described in Example 1 and the diazo compound is added to N-hydroxyethyl-N-cyanoethylminobenzene. The new dyestuff formed dissolves in organic solvents and in 1% sodium hydroxide with an orange coloration, and in concentrated sulfuric acid with a red-violet coloration.

It is applied to cellulose acetate fibers and polyamide fibers from aqueous suspension at high temperature, preferably in presence of compounds with dispersing action, to give brilliant yellow-orange shades which show good fastness to light, gas fumes, sublimation, and wet treatments. The dyeings are readily dischargeable.

When in place of N-hydroxyethyl-N-cyanoethylaminobenzene aliquot amounts of N-ethyl-N-cyanoethylaminobenzene (Example 4) or 1-(N-hydroxyethyl-N-cyanoethyl)-amino-3-methylbenzene (Example 5) are employed, similar dyestuffs are obtained which exhibit virtually the same light fastness.

On the other hand, by using as coupling components the ethylcarbamic ester of 1-(N-ethyl-N-hydroxyethyl-amino-3-methylbenzene (Example 6), 1-N,N-di-(acetoxyethyl)-amino-3-acetylaminobenzene (Example 7), 1-N,N-di-(acetoxyethyl)-amino-3-acetylamino-6-methoxybenzene (Example 8) or 1-N,N-di-(acetoxyethyl)-amino-3-propionylaminobenzene (Example 9), dyestuffs of a somewhat more reddish shade are obtained which in part show better fastness to washing.

Example 10: When the 100 parts of methylamine in the first paragraph of Example 2 are replaced by 140 parts of dimethylamine, the intermediate product obtained is 1-acetylaminonaphthalene-4-sulfonic acid dimethylamide with a melting point in the crude state at 200–204°. It can be hydrolysed in a similar manner to give 1-aminonaphthalene-4-sulfonic acid dimethylamide of the formula

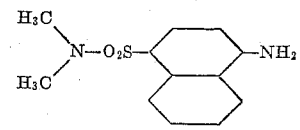

When the diazo compound obtained from this is combined in a similar way with 1-(N-hydroxyethyl-N-cyanoethyl)-amino-3-methylbenzene, an orange disperse dyestuff is obtained which has similar fastness properties and dissolves in concentrated sulfuric acid with a red-violet coloration.

By using in place of the aforementioned diazo compound one from 1-aminonaphthalene-4-sulfonic acid-N-methyl-N-phenylamide (Example 11) or 1-aminonaphthalene-4-sulfonic acid-N-(2'-hydroxy)-ethyl-N-phenylamide (Example 12) dyestuffs of very good solubility in acetone are obtained which are suitable for the dope dyeing of secondary cellulose acetate and cellulose triacetate.

Example 13: 23.45 parts of 1-amino-2-chlorobenzene-4-sulfonic acid dimethylamide are aded to 130 parts of concentrated sulfuric acid at 60°. In the course of 1 hour 7 parts of solid sodium nitrite are added to the solution. The reaction mass is stirred for 1 hour at 60° and then run into a mixture of 500 parts of ice and 200 parts of water. If a slight excess of nitrous acid is present it is destroyed by an addition of 0.5 part of amidosulfonic acid. To the diazo solution obtained are added 18 parts of N-ethyl-N-cyanoethylaminobenzene (B.P..₀.₁ 115°). Formation of the dyestuff takes place immediately. The dyestuff paste is filtered off, the residue washed free of acid, and dried. The new dyestuff corresponds to the formula

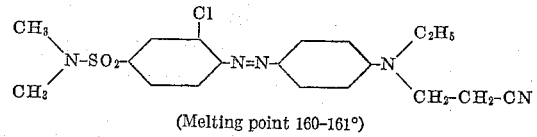

(Melting point 160–161°)

It dyes secondary cellulose acetate and cellulose triacetate, polyamide fibers and polyester fibers in brilliant orange shades of high tinctorial strength which have good fastness to light and excellent fastness to washing, perspiration, sea water, gas fumes, sublimation, pleating and cross dyeing. The dyeings are dischargeable with ease and the dyestuff reserves viscose rayon and cotton satisfactorily; the wool reserve too is fairly good and can be improved by suitable aftertreatment, e.g. with hydrosulfite.

A dyebath is prepared with 1 part of the above-described dyestuff dispersed with the aid of Turkey red oil, 6 parts of a sulfonated fatty alcohol and 3000 parts of water. 100 parts of secondary cellulose acetate fabric are entered at room temperature. The temperature of the dyebath is increased to 80° in 1 hour and this temperature maintained for a further hour. After this time the dyeing process is completed. The dyed fabric is removed, rinsed and dried.

Similar dyeing properties are possessed by the following dyestuffs which are produced in an analogous manner:

Example 14: 4-(N-methyl - N - cyanoethyl)-amino-2'-chloroazobenzene-4'-sulfonic acid amide, M.P. 174–175°.

Example 15: 4-(N-methyl - N - cyanoethyl)-amino-2'- chloroazobenzene - 4' - sulfonic acid methylamide, M.P. 153–155°.

Example 16: 4-(N-methyl - N - cyanoethyl)-amino-2'-chloroazobenzene-4'-sulfonic acid dimethylamide, M.P. 148–149°.

Example 17: 4-(N-ethyl - N - cyanoethyl)-amino-2'-chloroazobenzene-4'-sulfonic acid amide, M.P. 167–169°.

Example 18: 4-(N-ethyl - N - cyanoethyl)-amino-2'-chloroazobenzene-4'-sulfonic acid methylamide, M.P. 136–138°.

Example 19: 4-(N-propyl - N - cyanoethyl)-amino-2'-chloroazobenzene-4'-sulfonic acid amide, M.P. 171–172°.

Example 20: 4'-(N-propyl - N - cyanoethyl)-amino-2'-chloroazobenzene-4'-sulfonic acid methylamide, M.P. 144–146°.

Example 21: 4-(N-butyl - N - cyanoethyl)-amino-2'-chloroazobenzene-4'-sulfonic acid amide, M.P. 145–147°.

Example 22: 4-(N-butyl - N - cyanoethyl)-amino-2'-chloroazobenzene-4'-sulfonic acid methylamide, M.P. 126–129°.

Example 23: 4-(N-butyl - N - cyanoethyl)-amino-2'-chloroazobenzene-4'-sulfonic acid dimethylamide, M.P. 134–135°.

Example 24: 4-(N-acetoxyethyl - N - cyanoethyl)-amino-2'-chloroazobenzene-4'-sulfonic acid amide, M.P. 162–164°.

Example 25: 4-(N-acetoxyethyl - N - cyanoethyl)-amino-2'-chloroazobenzene-4'-sulfonic acid methylamide, M.P. 130–131°.

Example 26: 4-(N-acetoxyethyl - N - cyanoethyl)-amino-2'-chloroazobenzene-4'-sulfonic acid dimethylamide, M.P. 139–140°.

Similar dyestuffs are obtained when the sulfonic acid dimethylamide group in Example 4 is replaced by a sulfonic acid ethylamide group (Example 27), a sulfonic acid iso-propylamide (Example 28), a sulfonic acid hydroxyethylamide group (Example 29) or a sulfonic acid methoxypropyl amide group (Example 30).

Example 31: 4-(N-methyl - N - cyanoethyl)-amino-2'.5'-dichloroazobenzene-4'-sulfonic acid methylamide, M.P. 202–203°.

Example 32: 4-(N-ethyl - N - cyanoethyl)-amino-2'.5'-dichloroazobenzene-4'-sulfonic acid methylamide, M.P. 220–222°.

Example 33: 4-(N-propyl - N - cyanoethyl)-amino-2'.5'-dichloroazobenzene-4'-sulfonic acid methylamide, M.P. 136–137°.

Example 34: 4-(N-butyl - N - cyanoethyl)-amino-2'.5'-dichloroazobenzene-4'-sulfonic acid methyl amide, M.P. 157–160°.

Example 35: 4-(N-methyl - N - cyanoethyl)-amino-2'.5'-dichloroazobenzene-4'-sulfonic acid amide, M.P. 179–180°.

Example 36: 4-(N-ethyl - N - cyanoethyl)-amino-2'.5'-dichloroazobenzene-4'-sulfonic acid amide, M.P. 190°.

Example 37: 4-(N-propyl - N - cyanoethyl)-amino-2'.5'-dichlorozabenzene-4'-sulfonic acid amide, M.P. 168–170°.

Example 38: 4-(N-butyl - N - cyanoethyl)-amino-2'.5'-dichloroazobenzene-4'-sulfonic acid amide, M.P. 156–159°.

Example 39: 4-(N-acetoxyethyl - N - cyanoethyl)-amino-2'.5'-dichloroazobenzene-4'-sulfonic acid amide, M.P. 159–162°.

Example 40: 4-(N-acetoxyethyl - N - cyanoethyl)-amino-2'.5'-dichloroazobenzene-4'-sulfonic acid methylamide, M.P. 160–163°.

Example 41: 4-(N-methyl - N - cyanoethyl)-amino-2'.5'-dichloroazobenzene-4'-sulfonic acid-2''-hydroxyethylamide, M.P. 170–171°.

Example 42: 4-(N-ethyl - N - cyanoethyl)-amino-2'.5'-dichloroazobenzene-4'-sulfonic acid-2''-hydroxyethylamide, M.P. 110–112°.

Example 43: 4-(N-propyl - N - cyanoethyl)-amino-2'.5'-dichloroazobenzene-4'-sulfonic acid-2''-hydroxyethylamide, M.P. 118–120°.

The dyestuff 4-(N-ethyl - N - cyanoethyl)-amino-6'-chloro-1,1'-azobenzene-2'.4'-di(sulfonic acid methylamide) (Example 44) with melting point at 170° has a somewhat yellower and duller shade, but shows equally good affinity for secondary cellulose acetate and gives dyeings with good fastness properties.

Dyestuffs which are substituted in the 2'-position by hydrogen, e.g. Example 45:

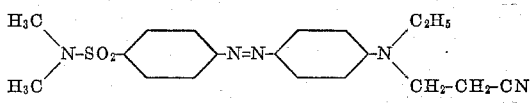

dye secondary cellulose acetate, cellulose triacetate, polyamide fibers and polyester fibers in fast yellow shades. Further dyestuffs possessing similar fastness properties are Example 46: 4-(N-acetoxyethyl-N-cyanoethyl)-aminoazobenzene-4'-sulfonic acid methylamide, M.P. 152–154°.

Example 47: 4-(N-acetoxyethyl-N-cyanoethyl)-aminoazobenzene-4'-sulfonic acid dimethylamide, M.P. 122–125°.

Dyestuffs analogous to Example 13 are obtained from 1-amino-2-bromobenzene-4-sulfonic acid methyl- (Example 48), ethyl- (Example 49), or propylamide (Example 50). Particularly good washing fastness is shown by the dyestuffs Example 51:

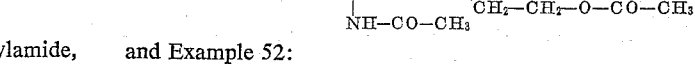

and Example 52:

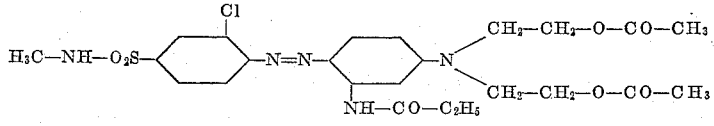

which dye cellulose acetate fibers and polyamide from aqueous dyebaths in red-orange shades.

The dyestuff 4'-(N-ethyl-N-cyanoethyl)-amino-2-trifluoromethyl-1-1'-azobenzene-4-sulfonic acid methylamide (Example 53) possesses similar dyeing properties, while the yellower dyestuff 4'-(N-acetoxyethyl-N-cyanoethyl)-amino-2-trifluoromethyl-1.1'-azobenzene-4-sulfonic acid-N-methyl-phenylamide (Example 54) is more suitable for the dyeing of fibers, plastic sheet and lacquers of cellulose acetate in the mass.

Disperse dyestuffs of redder shade with very good fastness properties are the compounds 4'-(N-acetoxyethyl-N-cyanoethyl) - amino-2-cyano-1.1'-azobenzene-4-sulfonic acid methylamide (Example 55), 4'-(N-methyl- or -ethyl-N - cyanoethyl) - amino - 2-cyano-1.1'-azobenzene-4-sulfonic acid methyl amide (Examples 56+57) and 4'-bis-(N-acetoxyethyl)-amino-2'-acetylamino- or -trifluoroacetylamino- or -propionylamino-2-cyano-1,1'-azobenzene-4-sulfonic acid dimethylamide (Examples 58–60).

In the following table further monoazo dyestuffs are recited which may be produced in an analogous manner as described in the foregoing examples. They correspond to the general Formula I.

| Ex. | R₁ | R₂ | R₃ | R₄ | R₅ | R₆ | Y | Color |
|---|---|---|---|---|---|---|---|---|
| 61 | CH(OH)—CH₃ | CH₂—CN | NH—CH₃ | H | Cl | Cl | H | Orange. |
| 62 | CH₂—CH₂—OH | CH₂—CN | NH—C₂H₅ | H | H | Br | CH₃ | Do. |
| 63 | CH₃ | CH₂—CN | NH—CH₂—CH₂—CN | H | Br | Br | H | Do. |
| 64 | CH₂—O—CH₃ | CH₂—CN | N(CH₃)CH₂—CH₂—OH | H | H | Cl | H | Do. |
| 65 | CH₂—O—CO—CH₃ | CH₂—O—CO—CH₃ | N(CH₃)₂ | H | H | Cl | H | Do. |
| 66 | CH₂—O—CO—CH₃ | CH₂—O—CO—CH₃ | NH—CH₃ | Cl | H | Cl | CH₃ | Do. |
| 67 | CH₂—O—CO—C₂H₅ | CH₂—O—CO—C₂H₅ | NH—C₃H₇ | Br | H | Br | H | Do. |
| 68 | CH₂—O—C₂H₅ | CH₂—CN | N(CH₃)₂ | CH₃ | H | Cl | H | Do. |
| 69 | CH₂—CH₂—O—CH₃ | CH₂—CN | N(C₂H₅)₂ | C₂H₅ | H | Cl | H | Do. |
| 70 | C₂H₅ | CH₂—CN | N(CH₃)₂ | CF₃ | H | Cl | H | Do. |
| 71 | C₃H₇ | CH₂—CN | N(CH₃)₂ | OCH₃ | H | Cl | H | Do. |
| 72 | C₃H₇ | CH₂—CN | N(CH₃)₂ | OC₂H₅ | H | Cl | H | Do. |
| 73 | C₂H₄—O—CO—NH—C₂H₅ | C₂H₄—O—CO—NH—C₂H₅ | NH—CH₂—CH₂—CN | H | H | Cl | C₂H₅ | Do. |
| 74 | CH₃ | CH₂—CN | N(CH₃)₂ | H | CN | H | CH₃ | Scarlet. |
| 75 | CH₂—O—CO—CH₃ | CH₂—CN | NH—CH₃ | H | SO₂—CH₃ | H | H | Orange. |
| 76 | CH₂—O—CO—C₂H₅ | CH₂—CN | NH—CH₃ | H | SO₂—C₂H₅ | H | H | Do. |
| 77 | CH₃ | CH₂—CN | NH—CH₃ | H | SO₂—NH—CH₃ | H | H | Do. |
| 78 | CH₃ | CH₂—CN | NH₂ | H | SO₂—N(CH₃)₂ | H | H | Do. |
| 79 | H | CH₂—CN | NH—CH₂—CH₂—CH₂—O—CH₃ | H | Cl | H | H | Do. |
| 80 | H | CH₂—CN | N(CH₃)₂ | H | Cl | H | OCH₃ | Do. |
| 81 | CH₂—O—CO—CH₃ | CH₂—O—CO—CH₃ | N(CH₃)₂ | H | H | Cl | CF₃ | Do. |
| 82 | CH₂—O—CO—CH₃ | CH₂—O—CO—CH₃ | NH—C₂H₅ | H | H | Cl | Cl | Do. |
| 83 | CH₂—O—CO—CH₃ | CH₂—O—CO—CH₃ | NH—CH₃ | H | H | Cl | Br | Do. |
| 84 | CH₂—O—CO—CH₃ | CH₂—O—CO—CH₃ | NH—CH₃ | Cl | H | Cl | NH—CO—CH₃ | Scarlet. |
| 85 | CH₂—O—CO—C₂H₅ | CH₂—O—CO—C₂H₅ | N(CH₃)₂ | H | CN | H | NH—CO—CH₃ | Do. |
| 86 | CH—O—CO—CH₃ \| CH₃ | CH—O—CO—CH₃ \| CH₃ | N(CH₃)₂ | H | Br | Br | NH—CO—CF₃ | Do. |
| 87 | C₂H₅ | CH₂—CN | N(CH₃)₂ | H | CN | Cl | CH₃ | Red. |

Examples 88 and 89: By using in place of the diazo compound named in Example 13 one of 1-amino-2.5-dichlorobenzene-4-sulfonic acid-N-methyl-N-phenylamide or 1-amino-2.5-dichlorobenzene-4-sulfonic acid-N-(2'-hydroxy)-ethyl-N-phenylamide, dyestuffs are obtained which have very good solubility in acetone and are suitable for the dyeing of cellulose acetate fibers in the mass.

Dyeings of particularly good fastness to gas fumes and chlorine are obtained when the dyestuff Example 90:

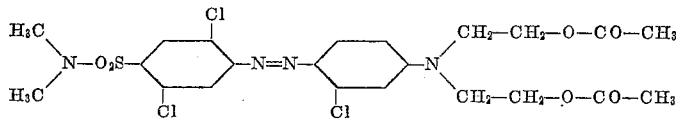

or the dyestuff Example 91:

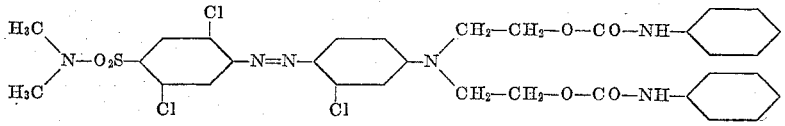

are dissolved in acetone together with cellulose acetate and the orange-colored mass spun in the normal way by the dry spinning process.

The spun dyeing method is as follows:

100 parts of secondary cellulose acetate are dissolved in 300 parts of a mixture of solvents consisting of 93% of acetone and 7% of methanol. The mass is mixed for a short time and left overnight to swell. 1 part of the monoazo dyestuff obtained according to the above example is dissolved in 60 parts of the same mixture of solvents by simple shaking. This solution is added to the cellulose acetate solution and the whole is mixed in an open vessel until 60 parts of the solvent mixture have evaporated. The dyed mass is pumped into the spinning machine and spun to give orange filaments. The dyeings are characterized by very good fastness to light, washing, cross dyeing, chlorine, oxalic acid, peroxide, sublimation, bleaching, gas fumes and dry cleaning, and are considerably stable to hydrosulfite. Similar properties are possessed by the dyestuff Example 92.

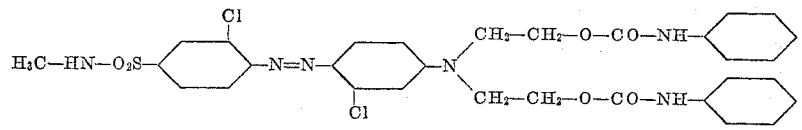

The latter dyestuff however has a much more yellowish shade in spun-dyed acetate than the above-mentioned dyestuffs.

The dyestuffs 4'-(N-methyl- or -ethyl- or -acetoxyethyl- N-cyanoethyl) - amino - 2 - cyano - 1.1' - azobenzene- 4 - sulfonic acid - N - methyl - N - phenylamide- or -N-ethyl-N-phenylamide or -N-cyclohexylamide (Examples 93–101), 4' - bis - (N -acetoxyethyl) - amino - 2'-decanoylamino - 2 - cyano - 1.1' - azobenzene - 4 - sulfonic acid dimethylamide (Example 102) and the bis-phenylcarbamic acid ester of 4'-di-(2''-hydroxy)-ethyl-amino - 2' - chloro - 2 - cyano - 1.1' - azobenzene - 4 - sulfonic acid dimethylamide (Example 103) are suitable for producing fast, brilliant red-orange to scarlet shades in the mass.

In the following table further monoazo dyestuffs are recited which may be produced in an analogous manner as described in the foregoing examples and which are suitable for dyeing cellulose diacetate and triacetate fibers in the mass. They correspond to the formula

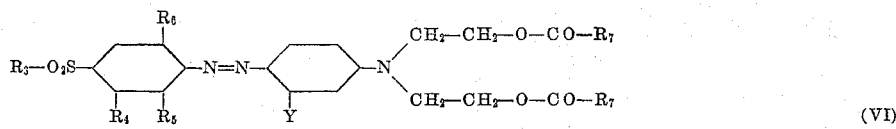

| Examples | R₃ | R₄ | R₅ | R₆ | R₇ | Y | Color |
|---|---|---|---|---|---|---|---|
| 104 | N(C₄H₉)₂ | Cl | H | Cl | C₂H₅ | Cl | Orange. |
| 105 | N(C₄H₉)₂ | H | SO₂—N(C₄H₉)₂ | H | NH—C₆H₅ | Cl | Do. |
| 106 | N(CH₃)₂ | H | CN | H | NH—C₆H₁₃ | Cl | Scarlet. |
| 107 | N(C₄H₉)₂ | H | Br | H | NH—C₆H₅ | Cl | Orange. |
| 108 | N(C₄H₉)₂ | H | Cl | H | NH—C₆H₅ | Cl | Do. |
| 109 | N(C₄H₉)—C₆H₅ | H | Cl | H | NH—C₆H₅ | Cl | Do. |
| 110 | N(C₆H₅)—CH₂—CH₂—CN | H | Cl | H | NH—C₆H₅ | Br | Do. |
| 111 | NH—CH₂—CH₂—CH₂—O—CH₃ | H | Cl | H | NH—C₆H₅ | Cl | Do. |
| 112 | NH—CH₂—CH₂—O—CH₂—CH₃ | Cl | H | Cl | NH—C₆H₅ | Cl | Do. |
| 113 | NH—C₆H₅ | Cl | H | Cl | C₂H₅ | NH—CO—C₃H₇ | Scarlet. |
| 114 | NH—C₆H₅ | Cl | H | Cl | NH—C₆H₅ | NH—CO—C₉H₁₉ | Do. |
| 115 | N(C₃H₇)—C₆H₅ | H | Cl | H | NH—C₆H₅ | NH—CO—C₁₇H₃₅ | Do. |
| 116 | N(CH₃)₂ | H | SO₂—CH₂—CH=CH₂ | H | NH—C₆H₁₇ | Cl | Orange. |
| 117 | NH—C₄H₉ | OC₂H₅ | H | Cl | NH—C₆H₅ | Cl | Do. |
| 118 | N(CH₂—CH₂—OH)₂ | Cl | Cl | Cl | NH—C₆H₅ | Cl | Do. |
| 119 | N(C₆H₅)₂ | H | Br | Br | NH—C₆H₅ | Cl | Do. |
| 120 | N(C₄H₉)₂ | H | Cl | H | NH—C₆H₄—CH₃ | Cl | Do. |
| 121 | N(C₄H₉)₂ | H | CN | H | NH—C₆H₄—CH₃ | Cl | Do. |
| 122 | N(CH₃)₂ | H | SO₂—CH₃ | Br | NH—C₂H₅ | Cl | Do. |
| 123 | NH—C₆H₁₃ | H | SO₂—NH—C₆H₁₃ | H | NH—C₁₀H₇ | Cl | Do. |

Formulae of representative dyestuffs of the foregoing examples are as follows.

Example 16:

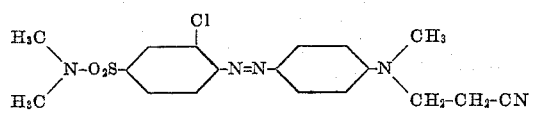

Example 18:

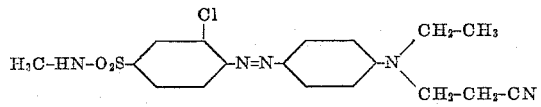

Example 22:

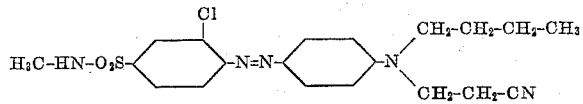

Example 34:

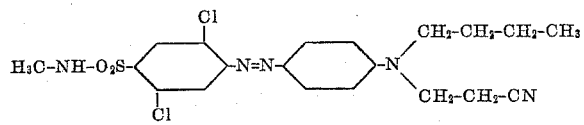

Example 47:

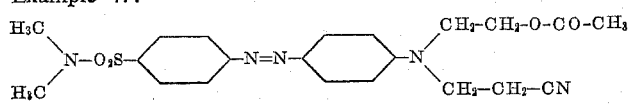

Having thus disclosed the invention what we claim is:

1. A monoazo dyestuff having low solubility in water, the formula of which is $$R_3'\diagdown N-SO_2-\bigcirc(Cl)-N=N-\bigcirc-N\diagup^{lower\ alkyl}_{CH_2-CH_2-CN}$$

wherein R₃' is a member selected from the group consisting of hydrogen and lower alkyl.

2. The monoazo dyestuff corresponding to the formula $$H_3C\diagdown N-O_2S-\bigcirc(Cl)-N=N-\bigcirc-N\diagup^{CH_3}_{CH_2-CH_2-CN}$$

3. The monoazo dyestuff corresponding to the formula $$H_3C-HN-O_2S-\bigcirc(Cl)-N=N-\bigcirc-N\diagup^{CH_2-CH_3}_{CH_2-CH_2-CN}$$

4. The monoazo dyestuff corresponding to the formula $$H_3C-HN-O_2S-\bigcirc(Cl)-N=N-\bigcirc-N\diagup^{CH_2-CH_2-CH_2-CH_3}_{CH_2-CH_2-CN}$$

References Cited in the file of this patent

UNITED STATES PATENTS

| | | |
|---|---|---|
| 1,975,160 | Jordan et al. | Oct. 2, 1934 |
| 2,082,156 | Felix et al. | June 1, 1937 |
| 2,109,024 | Holzach et al. | Feb. 22, 1938 |
| 2,782,186 | Merian | Feb. 19, 1957 |
| 2,891,942 | Merian | June 23, 1959 |